July 28, 1931. W. SCHNELL ET AL 1,816,199

RADIATOR CAP

Filed Feb. 15, 1929

INVENTORS
William Schnell and
John B. Flynn
BY
Stuart C. Barnes
ATTORNEY

Patented July 28, 1931

1,816,199

UNITED STATES PATENT OFFICE

WILLIAM SCHNELL AND JOHN B. FLYNN, OF DETROIT, MICHIGAN, ASSIGNORS TO TERNSTEDT MANUFACTURING COMPANY, OF DETROIT, MICHIGAN, A CORPORATION OF MICHIGAN

RADIATOR CAP

Application filed February 15, 1929. Serial No. 340,103.

This invention relates to a radiator cap.

The present invention can be better understood in view of a brief history of the development of the ornamental radiator cap. When the ornamental radiator cap first came into vogue, the radiator cap was adapted to have a threaded engagement with the filler tube. This threaded engagement of the ornamental cap with the filler tube was disadvantageous in that it was practically impossible to screw the cap into tight engagement with the filler tube and at the same time properly align the ornament. Invariably, when the cap had been properly screwed down, the ornament would be out of alignment. To obviate this misalignment of the ornament, a radiator cap having a hinged cover and a clamp for holding this cover in closed position was developed. The clamp, although efficient mechanically, has heretofore proved crude from the esthetic standpoint and the modern esthetic trend in automobile design requires that a crude clamp should no longer be used on a radiator cap. Fully appreciating this development, the applicant has produced an ornamental radiator cap of the desirable hinged cover and clamp type in which the clamp is so camouflaged as to appear as an integral part of the ornamental cap.

Figure 1:
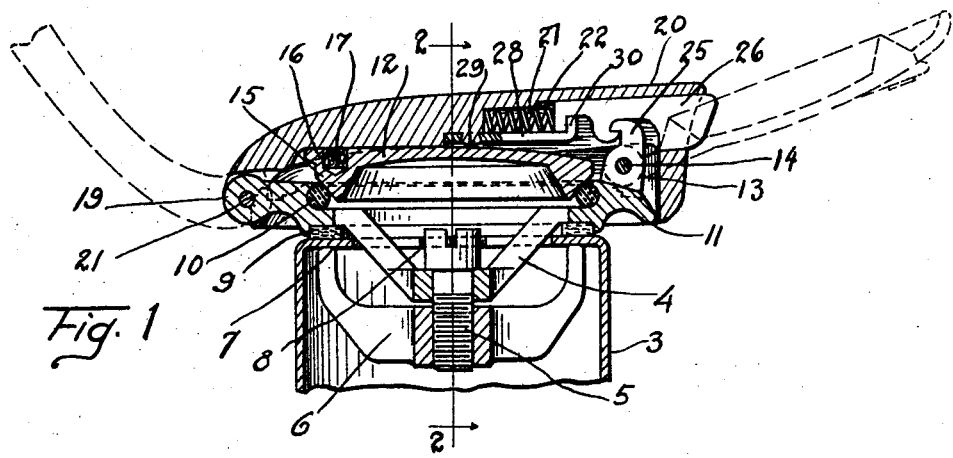
Fig. 1 is a vertical section of the cover along the line 1—1 of Fig. 2.
Figure 3:
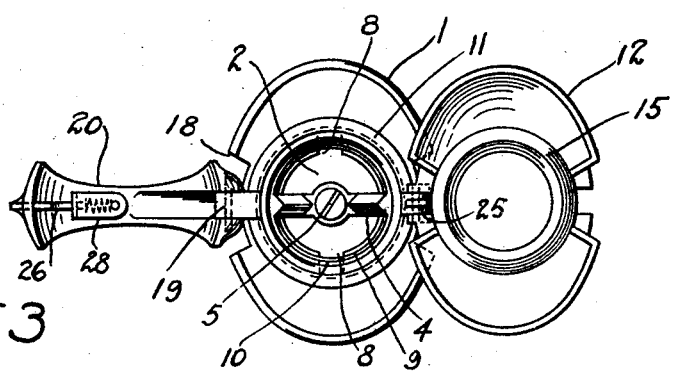
Fig. 3 is a top plan view of the radiator cap showing both the cover and the clamp in open position.
Figure 2:
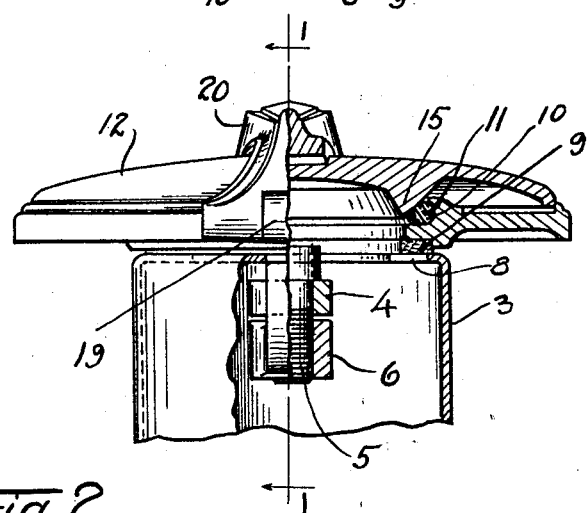
Fig. 2 is a vertical half-section along the line 2—2 of Fig. 1.

The radiator cap consists of the adapter 1 which has the centrally located opening 2. The adapter is adapted to be attached to the filler tube 3 of the radiator. For this purpose the adapter has the spider 4 which rotatively carries the screw 5. The screw 5 threadedly engages the clamp 6. The filler tube 3 has the circular flange 7 with the diametrically opposed slots 8. The flat rubber washer 9 is interposed between the adapter and the filler cap flange 7.

To attach the adapter to the filler tube the catch 6 is projected through the slots 8 in the filler tube flange and then turned sufficiently to engage the filler tube flange. The screw 5 is then turned so that the adapter and washer 9 are drawn tight upon the filler tube.

The opening 2 in the adapter is surrounded by a circular groove 10 which serves as a seat for the resilient washer 11.

The opening 2 in the adapter is closed by the hinged cover 12. The adapter has the projecting lug 13 which is bifurcated to receive the catch 25. The cover is hinged to the lug 13 by means of the pin 14 and has the annulus 15 which engages the resilient washer 11. The cover has cast therein the hole 16 which is adapted to receive the resilient bumper 17, the purpose of which will be explained below.

The adapter has the recessed portion 18 and the projecting lug 19 to which is hinged the clamp 20 by means of the pin 21. The clamp has a recess therein for the reciprocable latch 26 and the spring 27 which resists retraction of the latch. The spring is held in the recess 22 of the clamp by the plate 28 which is fixed to the clamp by the riveted lug 29. The plate 28 has the lug 30 which serves as a guide for the latch and a stop to retain the latch 26 within the recessed portion of the clamp.

When the cover is closed, as shown in Fig. 1, the clamp may be swung about its hinge until the clamp latch 26 engages behind the catch 25 which holds the clamp in latched position. When closed, the clamp engages the bumper 17 on the cover 12 and tightly holds the cover in closed position not only against the resilient washer but also against any gas pressure created by the heating of the water in the radiator.

In operation, when the cover and clamp are closed, the resilient washer 11 is compressed, consequently when the reciprocable clamp latch 26 is pressed against the resistance of spring 27 to release the latch from the catch 25, the expansive force of the resilient washer 11 acting through the cover 12 causes the clamp to spring open toward the position shown by the dotted lines in Fig. 1. Upon the release of the clamp 20, the cover 12 is free to open and consequently, the expansive force of the resilient washer 11 causes the cover to be partially opened so that it can be easily engaged by the hand in order to be opened completely as shown by the dotted lines in Fig. 1.

It is evident from the above description that I have produced a hinged cover radiator cap which is efficient and simple both in construction and operation.

I claim:

1. A cap for radiator filler tube or the like, consisting in combination of an adapter arranged to cooperate with the open end of the filler tube, a hinged cover for the adapter, said cover having a seat, and locking means for the cover having a camouflaged engagement with the cover in the said seat so that the cover and locking means appear integral.

2. A cap for radiator filler tube or the like, consisting in combination of an adapter arranged to cooperate with the open end of the filler tube, a hinged cover for the adapter, said cover having a depression and an ornamental clamp arranged to fit into the said depression to lock said cover and have a camouflaged engagement with the cover so that the cover and ornamental clamp appear integral.

3. A cap for radiator filler tube or the like, consisting in combination of an adapter arranged to cooperate with the open end of the filler tube, a hinged cover for the adapter, said cover having a depressed seat, and a clamp for said cover, said clamp engaging the cover in the said depressed seat and overlapping the same adjacent the said seat whereby the clamp appears integral with the cover.

4. A cap for radiator filler tube or the like, consisting in combination of an adapter arranged to cooperate with the open end of the filler tube, a hinged cover for the adapter, said cover having a depressed seat, and a hinged clamp for said cover, said clamp engaging the cover in the said depressed seat and overlapping the same adjacent the said seat whereby the clamp appears integral with the cover.

5. A closure for receptacles having an opening therein consisting in combination, of a radiator filler tube having a flanged opening, an adapter for said filler tube having a spider, said adapter arranged to carry a closure member, a catch arranged to fit within said filler tube, and means carried by the adapter cooperating with said spider to draw said catch and adapter into tight engagement with said filler tube flange.

6. A closure for receptacles having an opening therein consisting in combination, of a radiator filler tube having a flange with opposed openings therein, an adapter, arranged to carry a closure member, a catch adapted to pass through the openings in said filler tube flange and to engage the said flange, and means carried by the adapter for drawing said catch and adapter into tight engagement with the filler tube flange.

7. A closure for receptacles having an opening therein consisting in combination, of a filler tube having an internal flange, an adapter for said tube having a downwardly projecting spider, a catch arranged to fit within said filler tube, and screw means for said spider and catch for drawing said catch and adapter into tight engagement with said filler tube flange.

8. In a cap for a radiator filler tube, or the like, the combination of a hinged cover, a clamp for said cover, and reciprocable means within said clamp for positively locking said clamp in closed position.

9. A cap for a radiator filler tube or the like, having in combination an adapter, a hinged cover, a clamp, and means in slidable relation with said clamp for engaging a portion of said adapter to positively lock said clamp and cover in closed position.

10. A cap for a radiator filler tube or the like, having in combination, an adapter, a hinged cover, a clamp, and a reciprocable latch for said clamp for engaging a portion of said adapter to lock said clamp and cover in closed position.

11. A radiator cap having in combination, an adapter, a hinged cover, a resilient bumper on said hinged cover, and means for engaging said bumper to hold the cover in closed position.

12. A radiator cap having in combination, an adapter, a hinged cover, a resilient bumper on said hinged cover, and a clamp for engaging said bumper to hold the cover in closed position.

In testimony whereof we have affixed our signatures.

WILLIAM SCHNELL.
JOHN B. FLYNN.